(12) United States Patent
Yeh

(10) Patent No.: US 6,439,522 B1
(45) Date of Patent: Aug. 27, 2002

(54) MOUNTING DEVICE FOR A FLORIST BASKET

(76) Inventor: Jui-Ju Yeh, Taipei (TW)

( * ) Notice: Subject to any disclaimer, the term of this patent is extended or adjusted under 35 U.S.C. 154(b) by 0 days.

(21) Appl. No.: 09/904,504

(22) Filed: Jul. 16, 2001

(51) Int. Cl.[7] .............................................. A47B 96/06
(52) U.S. Cl. ........................... 248/231.71; 248/229.25; 248/228.6; 248/230.6
(58) Field of Search ..................... 248/229.25, 228.6, 248/230.6, 231.71, 213.2

(56) References Cited

U.S. PATENT DOCUMENTS 730,203 A * 6/1903 Browning ................... 248/137
4,149,694 A * 4/1979 Verini ..................... 248/231.41
5,020,765 A * 6/1991 Evans et al. ............ 248/231.71

* cited by examiner

Primary Examiner—Leslie A. Braun
Assistant Examiner—Deborah Brann
(74) Attorney, Agent, or Firm—Rosenberg, Klein & Lee

(57) ABSTRACT

A mounting device for a florist basket has a mount and a bracket detachably connected with the mount. The mount consists of a C-clamp so that the mount is able to attach to an object by adjusting the adjustment screw inside the mount. The bracket has a slot defined to allow the extension of a top horizontal arm of the mount and an extension formed to detachably engage with the top horizontal arm. The bracket further has a pair of hooks and seats so defined that one of multiple lateral strands of the florist basket is able to be received in the seats.

1 Claim, 3 Drawing Sheets

MOUNTING DEVICE FOR A FLORIST BASKET

BACKGROUND OF THE INVENTION

1. Field of the Invention

The present invention relates to a mounting device, and more particularly to a mounting device for a florist basket. The mounting device has a bracket adapted to detachably connect with the florist basket and a mount with an adjustment screw to adjustably attach the mount to an object.

2. Description of Related Art

A conventional florist basket usually stands alone on a table or is attached to an object by means of a wire. When there is no room for the florist basket to be placed on a table, counter, etc. or using the wire is inappropriate, there is no way for the florist basket with flowers in the basket to be used as a decoration or to display flowers. Therefore, when a customer requests that a flower basket be used and no appropriate location or existing fixture exists to attach the florist basket to an object, other fixtures such as additional tables or individual stands must be used, which are often inappropriate or inconvenient. However, when there is inadequate room or additional fixtures cannot be used, use of the florist basket as a decoration must be abandoned.

To overcome the shortcomings, the present invention provides an improved mounting device to mitigate and obviate the aforementioned problems.

SUMMARY OF THE INVENTION

The primary objective of the present invention is to use an adjustable mount to mount a florist basket on an object so that even when there is no surface on which the florist basket can stand, the florist basket can be easily mounted on an edge of an object.

Another objective of the invention is to have hooks on distal ends of two extending legs of the bracket and mounting seats each formed to correspond to one of the hooks so as to define a gap between the hook and the mounting seat. With such an arrangement, the bracket is able to be adapted to connect with a lateral strand of the florist basket.

Still another objective of the present invention is to provide an elongated hole in the mount such that after the mount is secured to the object to which the florist basket is to be attached, the mount is able to move with respect to the object.

Other objects, advantages and novel features of the invention will become more apparent from the following detailed description when taken in conjunction with the accompanying drawings.

DETAILED DESCRIPTION OF THE PREFERRED EMBODIMENT

Figure 1:
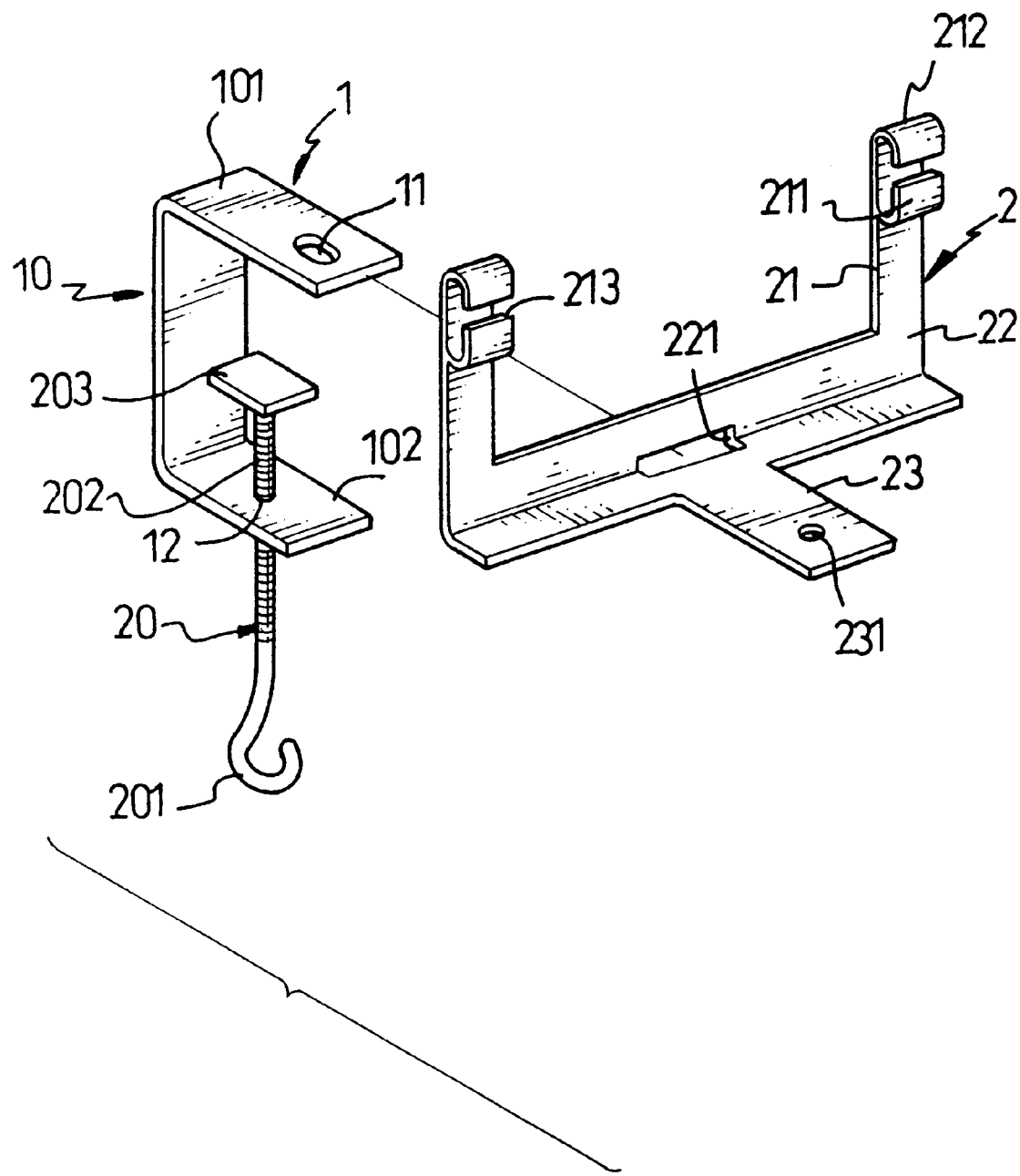
FIG. 1 is an exploded perspective view of the mounting device in accordance with the present invention.

With reference to FIG. 1, the mounting device in accordance with the present invention comprises a mount (1) and a bracket (2).

The mount (1) includes a U-shaped frame (10) and an adjustment screw (20). The U-shaped frame (10) has a top and a bottom and is comprised of a top horizontal arm (101), a bottom horizontal arm (102) and a vertical connecting member (not numbered). An elongated through hole (11) is defined in the top horizontal arm (101), and a threaded through hole (12) is defined in bottom horizontal arm (102) to hold the adjustment screw (20). The adjustment screw (20) has two ends. A driving device (201) such as wings, a handle, an eye, a hook, etc. is formed on one end. The other end has a long thread (202) with a contact plate (203) securely attached to the free end of the thread (202). The adjustment screw (20) screws through the through hole (12) in the bottom horizontal arm (102) of the frame (10), so that the contact plate (203) is able to move toward or away from the top horizontal arm (101) of the frame (10).

The bracket (2) includes two arms (21) extending vertically from opposite distal ends of an L-shaped base (22) and an extension (23) extending out horizontally from the base (22). Each of the arms (21) has a seat (211) integrally formed on an inner face of the arm (21) and a barb (212) formed on the free end of the arm (21) to correspond to the seat (211). A gap (213) is defined between the barb (212) and the seat (211). The base (22) has a slot (221) defined to correspond to the top horizontal arm (101), and the extension (23) has a first through hole (231) defined to correspond to the elongated through hole (11) in the top horizontal arm (101) of the frame (10).

Figure 2:
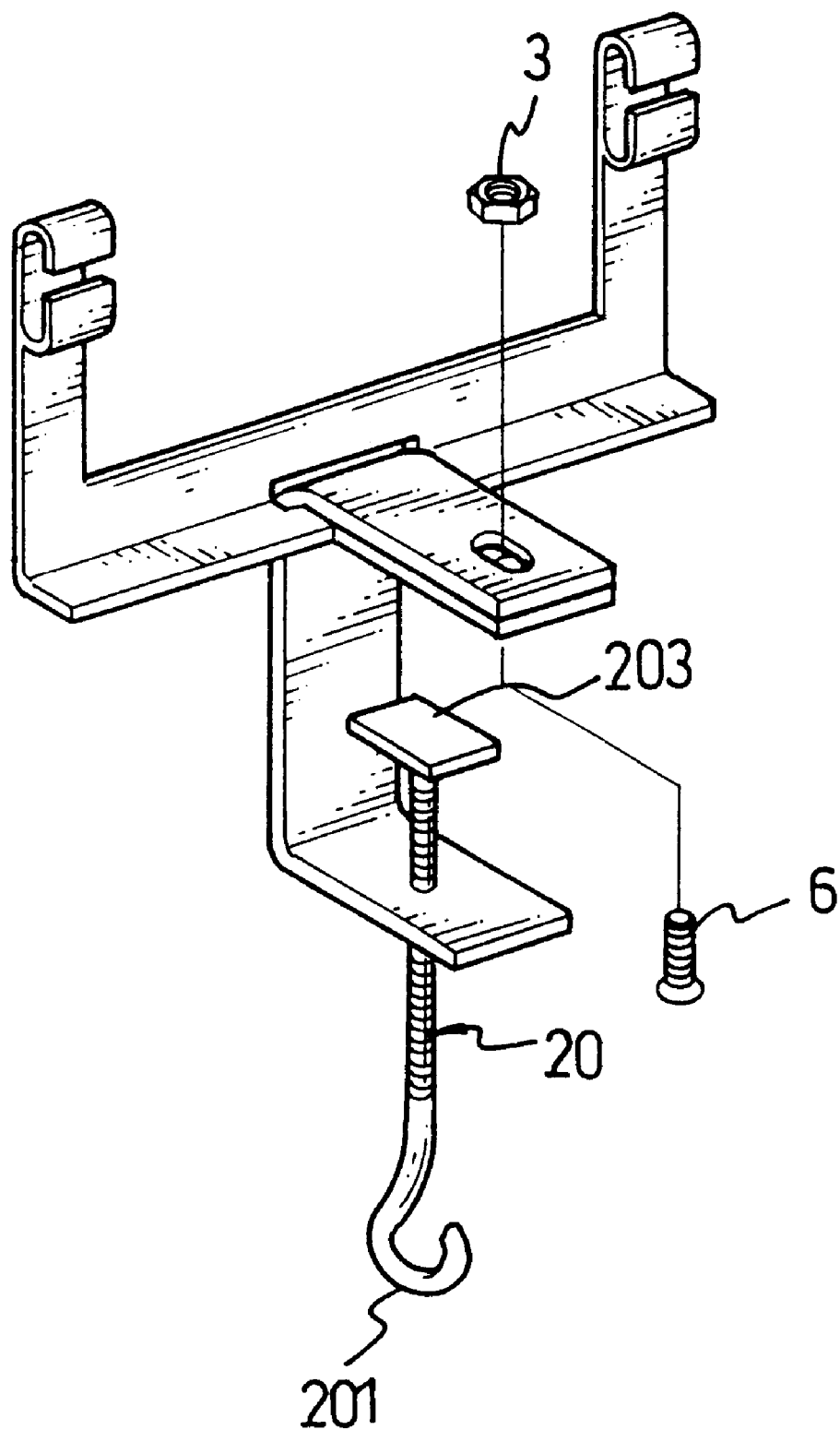
FIG. 2 is a perspective view of the mounting device in FIG. 1.

With reference to FIGS. 1 and 2, when the mounting device is assembled, the top horizontal arm (101) extends through the slot (221) to align the elongated through hole (11) with the first through hole (231). After the elongated through hole (11) and the first through hole (231) aligned, a bolt (6) and nut (3) combination securely connects the top horizontal arm (101) and the extension (23) thereby securing the bracket (2) to the mount (1).

Figure 3:
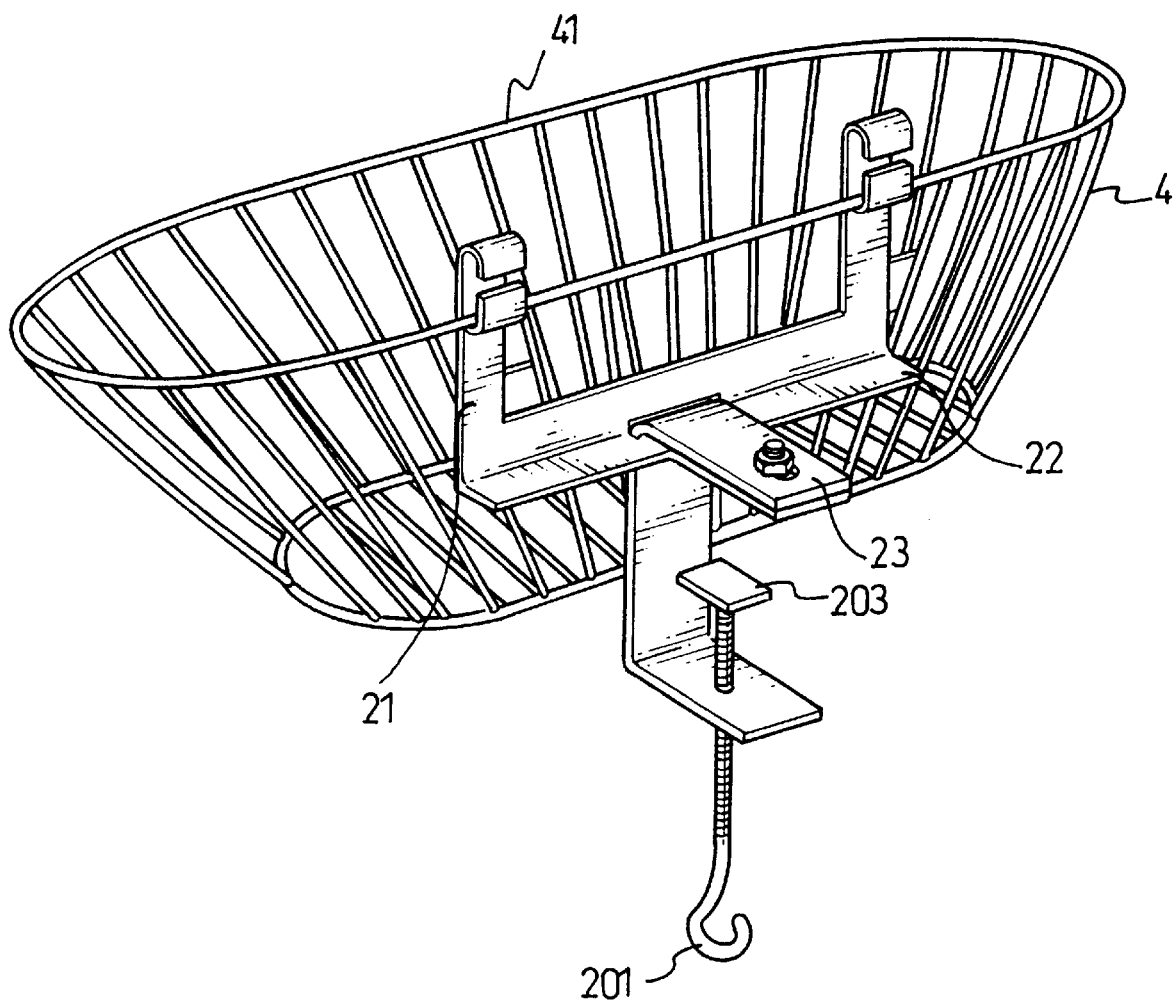
FIG. 3 is a perspective view of the combination of a florist basket and the mounting device in FIG. 1.

With reference to FIG. 3, when a florist basket (4) with multiple lateral strands (41) is to be attached to the mounting device, the user only needs to insert a certain strand (41) into the gap (213) to allow the seats (211) to hold the strand (41). With the mounting device assembled and the strand (41) in the seats (211), the assembly is complete. Thereafter, the adjustment screw (20) is tightened to clamp an object between the contact plate (203) and the extension (23) and the top horizontal arm (101). That is, the user turns the driving device (201) to screw the adjustment screw (20) to increase or decrease the distance between the contact plate (203) and the extension (23) and the top horizontal arm (101) so that the object is able to be securely clamped between the contact plate (203) and the extension (23) and the top horizontal arm (10).

The engagement between the top horizontal arm (101) and the extension (23) ensures that no accidental detachment between the mount (1) and the bracket (2) even after the bolt (6) and nut (3) combination is broken due to oxidation. Furthermore, the elongated through hole (11) in the top horizontal arm (101) allows the user to adjust the relative position of the object inside the frame (10).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting device for use with a florist basket, the mounting device consisting of:

a mount consisting of:

a U-shaped frame formed with a top horizontal arm that has an elongated through hole defined in the top horizontal arm and a bottom horizontal arm opposite to the top horizontal arm and a threaded through hole defined in the bottom horizontal arm; and an adjustment screw movably extending through the threaded through hole in the bottom horizontal arm and provided with a driving device at one distal end of the adjustment screw and a threaded end with a contact plate securely attached to the other end of the adjustment screw; wherein the threaded end of the adjustment screw is screwed through the threaded through hole in the bottom horizontal arm of the frame so that the contact plate is able to move toward or away from the top horizontal arm of the frame; and a bracket detachably engaged with the mount and consisting of:

an L-shaped base having a slot defined to allow the top horizontal arm to extend through the slot;

two arms each extending vertically from opposite distal ends of the L-shaped base, wherein each of the arms has a seat integrally formed on an inner face of the arm and a barb formed on an free end of the arm to correspond to the seat so as to define a gap between the barb and the seat; and an extension extending out horizontally from the base to detachably engage with the top horizontal arm of the U-shaped frame and having a first through hole defined to be aligned with the elongated through hole of the top horizontal arm, whereby the florist basket with lateral strands is able to be secured by the mounting device by inserting one of the strands in both of the seats.

* * * * *